United States Patent Office 3,376,354
Patented Apr. 2, 1968

3,376,354
SEPARATION PROCESS FOR CYCLIC OLEFINS
Wolfram R. Kroll, Linden, and Robert B. Long, Atlantic Highlands, N.J., assignors to Esso Research and Engineering Company, a corporation of Delaware
No Drawing. Filed Sept. 24, 1965, Ser. No. 490,109
10 Claims. (Cl. 260—666)

This invention is directed to the separation of cyclic olefins with different structures by contacting them with a sorption-active cuprous halide sorbent using either vapor or liquid phase contact.

More specifically, the present invention is directed to the separation and recovery of 1,5,9-trans,trans,trans-cyclododecatriene from hydrocarbon mixtures containing it along with 1,5,9,-cis,trans,trans,cyclododecatriene by contacting said mixture with an active cuprous halide sorbent at conditions such that the cis,trans,trans isomer selectively complexes with the active cuprous halide sorbent whereas the trans,trans,trans isomer passes therethrough uncomplexed but in a substantially purer form (more concentrated) than it was present in said mixture.

In the production of cyclododecatriene-1,5,9 by trimerization of butadiene, there are always a number of by-products, including undesired by-products, obtained. some of these by-products, e.g., vinylcyclohexene and cyclooctadiene, can be removed by distillation. In other cases, such distillation removal of undesired by-products is difficult, if not impossible. The by-products usually encountered in the production of 1,5,9-trans,trans,trans-cyclododecatriene by the above-mentioned trimerization of butadiene procedure are cyclooctadiene, vinylcyclohexene, 3-methylheptatriene, and the cis,trans,trans isomer of cyclododecatriene-1,5,9. The latter isomer (the cis,trans,trans isomer) is very difficult to separate by distillation procedures.

The present invention offers a straightforward, economical means of purifying cyclic olefin isomers and is especially advantageous in the separation of close boiling isomers. This invention is conducted readily by contact of the isomer mixture of olefins with a sorption-active cuprous halide sorbent. The present invention is especially applicable to the separation and purification of 1,5,9-trans,trans,trans-cyclododecatriene present along with the 1,5,9-cis,trans,trans-cyclododecatriene in reaction product mixtures such as those mentioned hereinabove.

According to a preferred embodiment of this invention, the complexing in such reaction is carried out with a porous, particulate, solid, sorption-active cuprous halide sorbent having a porosity of above about 10% (of the total volume of a particle) 550 to 10,000 A. pores. This contacting operation causes the more reactive olefinic compound to react and form solid crystalline complexes with said cuprous halide particles, whereas the less reactive olefinic compounds do not form a complex.

This complexing can be conducted over a wide range of temperatures, including ambient temperatures, i.e., 60 to 85 F., with or without the use of a solvent. Preferably, however, this complexing is conducted in the presence of a $C_5$ to $C_{16}$ hydrocarbon solvent in which the cuprous halide-ligand (cyclic impurities having at least one double bond) is substantially insoluable. The purified compound is obtained by filtration, decantation, or other suitable separation procedure to separate the liquid purified trans,trans,trans cyclododecatriene from the insoluable by-product complexes, including, e.g., the cis,trans, trans-cyclododecatriene, which are practically insoluble in $C_5$ to $C_{16}$ hydrocarbon solvents.

The above-indicated purification procedure can be conducted by passing the hydrocarbon feed mixture, containing the cyclic olefins, in either liquid or vapor phase contact with the porous, solid, particulate, sorption-active cuprous halide sorbent particles. After the separation of the TTT isomer has been completed, in the manner indicated hereinabove, the by-product complexes can be selectively dissociated, either by thermal decomplexation or other suitable procedures (e.g., solvent extraction) to release (desorb) the by-product olefinic components stepwise in the inverse order of the stability of the complexes which they individually form with the active cuprous halide sorbent, with the least stable complexes being desorbed first and so on. This can be accomplished readily by using different combinations of temperature and pressure or vacuum) for desorption. This allows release of the by-product(s) in a comparatively purified form, respectively, compared to their concentrations in the feed mixture. By carrying out the decomplexation stepwise utilizing the different stability constants of the respective cyclic olefin complexes, a comparatively straight-forward and economical fractionation of the by-products can thereby be achieved.

Besides the purification of TTT cyclododecatriene, this process can be used for the purification of 1,5 cyclooctadiene from 1,3-cyclooctadiene. The cuprous chloride complexes preferentially with the 1,5 isomer, whereas the 1,3 isomer does not react under these conditions.

The feasibility of a cuprous chloride separation of cyclic olefins is in great part determined by the order of stability of the complexes under the displacement conditions. This order has been determined for a number of cyclic olefins and is given below: norbornadiene and norbornene > dicyclopentadiene > cyclooctadiene 1,5 > cyclododecatriene (CTT) > cyclododecatriene (TTT) > cyclooctadiene-1,3 > vinylcyclohexene.

This means that norbornadiene (and also norborene) can be most easily removed from practically all feedstreams because of its great tendency of complex formation. Vinylcyclohexene (and also other terminal and internal monoolefins) cannot be removed from the above olefins because of its weakness as a complexable ligand for the cuprous chloride. The above order of stabilities allows ready determination of separations possible in accordance with this invention.

Instead of using free cuprous chloride one can also use a cuprous chloride complex of an olefinic compound. This way the exothermicity of the complexing reaction can be moderated by ligand exchange.

Because of the different reactivity of various types of olefins toward cuprous chloride it can be advisable to perform the complexing reaction stepwise at different temperatures. This is especially advantageous when going to lower temperatures and permits a number of olefins to be complexed that are unreactive at room temperature. Such a procedure can be of advantage in separating complex olefinic mixtures, e.g., those obtained in partial hydrogenations of $C_6$ to $C_{20}$ cyclic polyolefins. An application of such process is the stepwise complexing of partially hydrogenated cyclododecatriene. In this hydrogenation besides the saturated compound, the diene and the monoolefin are produced. In a stepwise separation the unreacted cyclododecatriene (CTT) is first removed by complexing with cuprous chloride at room temperature. The second step the diene is taken out at lower temperatures, e.g., 0° C., so that the remaining solution consists mainly of the saturated hydrocarbon and the monoolefin. This way the monoolefin can be obtained preferentially. Of course, such a process of stepwise complexing at various temperatures can be useful in other separation processes.

One object of this invention is to conduct separation processes involving cyclic olefins and cuprous chloride. Another object is the purification and recovery of certain monomers from feedstreams containing them even in dilute concentrations by selective complexing of the impurities with cuprous chloride. Moreover, these feedstreams can contain predominant amounts of saturated or aromatic hydrocarbons. Still another object of this invention is the stepwise separation of complex, liquid mixtures of olefins by stepwise complexing with cuprous chloride at various temperatures.

The separation of isomers is one important application of the present invention. This can be of direct advantage with insecticides and pesticides where only certain isomers are active. Also, the separation of endo- and exo-isomers of dicyclopentadiene and its derivatives is readily possibly by practice of the present invention. These and other objects of the present invention will be apparent from the discussion which follows.

Suitable cuprous halide salts from which the sorption-active cuprous halide sorbents can be produced include cuprous chloride, cuprous bromide, and cuprous iodide with the preferred cuprous halide salt being cuprous chloride. The purity of the cuprous halide salt should be at least about 90%. Usually the purity of the cuprous halide salt ranges from 90 to 100%, and preferably from about 95 to 100%. The moisture content of the cuprous halide salt at the onset of the sorption-active cuprous halide sorbent preparation procedure should usually not exceed 1.0 wt. percent, and preferably should not exceed about 0.5 wt. percent (based on dry cuprous halide salt).

The preparation of the sorption-active porous, particulate, solid cuprous halide sorbent particles which are employed in accordance with this invention can be conducted readily in accordance with the procedures set forth in U.S. patent application Ser. No. 333,925 now abandoned, filed by Robert B. Long and Warren A. Knarr on Dec. 27, 1963, and Ser. No. 333,926 now abandoned, filed by Robert B. Long also on Dec. 27, 1963, and the disclosures of both of said applications are incorporated herein by reference.

In general, the preparation of sorption-active cuprous halide sorbents having the requisite porosity of above about 10% (of the total volume of a particle) being 550 to 10,000 A. pores can be conducted conveniently in accordance with the below indicated exemplary procedure. To begin with, the dried cuprous halide salt can be dissolved in a wide variety of solvents, including both organic and inorganic solvents, as will be noted from Ser. No. 333,925 and Ser. No. 333,926 referred to hereinabove. A wide variety of organic solvents can be used to dissolve the cuprous halide salt, e.g., $C_4$ to $C_{10}$ monoolefins; refinery hydrocarbon streams containing a predominant portion of $C_4$ to $C_{10}$ monoolefins, including Types I, II, III, IV, and cyclic olefins, e.g., light fractions from steamed cracked naphthas; refinery hydrocarbon streams containing a predominant portion of monocyclic aromatic hydrocarbons, e.g., hydrocarbons raffinate streams, etc. Typically, a solvent is used in which the cuprous halide cyclic olefin complexes are insoluble. Suitable exemplary $C_4$ to $C_{10}$ monoolefinic solvents include, but are not limited to, the following: butene-1, isobutylene, pentene-1, hexene-, heptent-1, octene-, nonene-, decene-, and mixtures of any two or more of the above monoolefins with or without such optional hydrocarbon diluents as paraffins, cycloparaffins, multiolefins, etc. The cuprous halide salt is added to the suitable solvents, and the soluble and dissolved material therefrom, e.g., undissolved Usually, this dissolving step is conducted at temperatures ranging from about —40° to about 80° F., and more preferably ranging from about —10 to about 40° F. The cuprous halide salt is added gradually to the solvent with stirring or other agitation to secure dissolving.

After the formation of the cuprous halide solution in the the manner indicated hereinabove, the cuprous halide solution is usually treated to separate and thereby remove insoluble and dissolved material therefrom, e.g., undissolved cuprous halide salt, insoluble residues, etc. This separation treatment can be conducted by filtration, centrifugation, decantation, etc. Preferably, the cuprous halide solution is filtered to remove insolubles by precoating the filter with insolubles from previous runs. The thus clarified cuprous halide solution is then contacted with a suitable complexing agent capable of forming a stable copper complex having a mole ratio of copper to complexing agents of greater than 1:1. Upon dissociation of this complex, the active cuprous halide sorbent having the requisite porosity for use in accordance with this invention is obtained. From one point of view, this complexing agent can be considered as a "conditioning-complex" since it imparts to the cuprous halide salt the requisite porosity and activity, viz conditions it, for use in accordance with this invention. Suitable complexing agents which can be used for ths purpose include both materials which form only complexes having said ratio of copper to complexing compound greater than 1:1 and compounds which form complexes having a ratio of 1:1 or less, which upon decomplexing (desorption) pass through a stable complex having a ratio of copper to complexing compound greater than 1:1. Thus, certain materials e.g., nitriles diolefins acetylenes carbon monoxide etc. under ordinary conditions form a 2:1 complex can be made to complex in ratios of copper to complexing compound of 1:1 or less. However upon dissociation complexing material is released selectively from the bed of cuprous halide until the stable complex viz the complex having a copper to complexing agent ratio above 1:1 e.g. the 2:1 stoichiometric complex, is completely formed before further recomplexing to the uncomplexed (active) cuprous halide occurs. In this specification by "stable complex" is meant a stoichiometric complex stable upon dissociation as described in the preceding sentence. Such complexing agents (conditioning ligands) as contemplated herein include, but are not limited to, the following: carbon monoxide; organic nitriles, organic compounds having an acetylenic group, i.e., as present in acetylene; $C_3$ to $C_{20}$ polyolefins, e.g., allene, and especially $C_4$ to $C_{10}$ conjugated diolefins, e.g., butadiene, isoprene; etc. More than one of these functional groups can be present in a single molecule of the complexing compound. In addition, the complexing agent can contain other functional groups so long as they do not interfere with complex formation. A more comprehensive discussion of suitable complexing agents capable of use in preparing the sorption-active cuprous halide sorbents which are employed in accordance with this invention can be found in Ser. No. 333,925 and Ser. No. 333,926 referred to hereinabove.

The selected suitable complexing agent, preferably butadiene, is then contacted with the clarified cuprous halide solution at temperatures which can range from about —40 to about 100° F. for a sufficient period of time to precipitate out substantially all of the cuprous halide salt as the insoluble cuprous halide-butadiene complex. Mild agitation is usually employed, e.g., stirring, to insure adequate uniform contact of the dissolved salts and the butadiene or other suitable conditioning-ligand. Preferably, a solvent is employed to dissolve the cuprous solid salt in which the cuprous halide "conditioning" ligand complex is insoluble. Therefore, the cuprous halide "conditioning" ligand complex precipitates out and can be readily separated from the solvent. Usually, complexing is conduted at temperatures ranging from about —10 to about 80° F. in the manner indicated above. The "conditioning" ligand can be supplied to the cuprous halide solution in gaseous or liquid form, and it can be present as a comparatively pure ligand, or it can be diluted with nitrogen, paraffins, or other inert gases. Any suitable separation procedure can be employed, e.g., filtration, centrifugation, settling, etc., to recover the insoluble cuprous halide "conditioning" ligand complex from the solvent.

Following recovery of the cuprous halide "conditioning" ligand complex, the complex is dissociated, e.g., by thermal decomplexation, to produce directly the activated cuprous halide sorbent particles by subjecting the complex particles to conditions of temperature and pressure such that the dissociation pressure of the conditioning complex exceeds the partial pressure of the complexed conditioning ligand. Consequently, the complex decomposes with release of the conditioning-ligand which can be recovered by conventional recovery procedures. Drying (optional) and complexing are usually accomplished in the following manner. The complex, as a wet cake from the filtration or other suitable separation, is collected in a suitable vessel. Stripping gas is then admitted to the bottom of the vessel. Heat is applied to the vessel and/or stripping gas, which heat promotes drying of the complex. As the free liquid solvent is removed, the granular complex loses its cake form and the discrete particles readily fluidize. Decomplexing to form the active cuprous halide sorbent is then accomplished by heating it temperatures of about 100 to 220° F. and pressures ranging from about 1.5 to 150 p.s.i.a., and usually at temperatures of about 140 to190° F. and pressures of about 10 to 75 p.s.i.a. Typical thermal decomplexation conditions which can be used for this purpose are 0.3 ft./sec. superficial vessel stripping gas velocity and 170 to 190° F. vessel temperature at atmospheric pressure.

The activated cuprous halide sorbent particles thus prepared are porous and have a characteristic porosity above about 10% (of the total volume of a particle) 550 to 10,000 A. pores, as determined by mercury porosimeter measurements. The density of these active sorbent particles characteristically ranges from about 60 to about 90 lbs./cu.ft. (loose) and about 65 to about 97 lbs./cu.ft. (compacted). The average particle size diameter of said active cuprous halide sorbent particles characteristically ranges from about 50 to 125+ microns.

The separation of cyclic olefins in accordance with the present invention is conducted readily by contacting the sorption-active cuprous halide sorbent particles, e.g., in the form of a fixed or fluidized bed(s), with a gaseous or liquid hydrocarbon stream containing a mixture of the cyclic olefins to be separated therefrom. The cyclic olefins with more reactive double bonds present in the feed stream hydrocarbon mixture are selectively sorbed (complexed) on these active cuprous halide particles. The cyclic olefin with less reactive double bonds, e.g., 1,5,9-trans, trans, trans-cyclododecatriene, pass through substantially uncomplexed, but in greatly purified (concentrated) form. The sorbed (complexed) cyclic olefins can then be recovered from the loaded sorbent for example by heating, i.e., subjecting the loaded sorbent to conditions of temperature and pressure such that the dissociation pressure of the sorbent-cyclic olefin compounds, respectively, exceeds the partial pressure of the sorbed cyclic individual olefins. Consequently, these complexes decompose with release of the sorbed olefins, which are then collected by conventional means. As mentioned hereinabove, according to a preferred embodiment of this invention, the loaded sorbent (upon which the cyclic olefins, including the 1,5,9-cis, trans, trans-cyclododecatriene, are complexed) are thermally decomplexed selectively and sequentially to thereby release from the cuprous halide complex the cyclic cis olefins preferentially and inversely according to the stability of their complexes. As mentioned hereinabove, this can be conducted readily by use of different temperature-pressure (or vacuum) conditions thereby resulting in substantially pure release of fractionated byproducts from the cuprous halide sorbent complex.

In accordance with this invention, it has been observed that the active cuprous halide sorbent particles are capable of producing substantially purified 1,5,9-trans,trans, trans-cyclododecatrine from hydrocarbon mixtures and other streams containing it along with the 1,5,9-cis,trans, trans-cyclododecatrine isomer wherein the trans,trans, trans-cyclododecatrine content ranges as low as 15 wt. percent, and even lower, in the hydrocarbon mixtures which constitute the feed streams to the process of this invention. Of course, the process of this invention is likewise capable of producing essentially pure 1,5,9-trans, trans, trans-cyclododecatrine from hydrocarbon mixtures containing it in amounts greather than 15 wt. percent.

As mentioned previously, liquid phase complexing (sorption) can be used. When the sorption is conducted in the liquid phase in accordance with this invention; some, or even a substantial portion (50 wt. percent or even higher) of the cuprous halide sorbent can be raw salt, which is comparatively sorption inactive. In liquid phase sorption, the liquid feed stream is contacted with less than a stoichiometric amount of cuprous halide, eg. from about 50 to about 95% of the stoichiometric amount, for a time sufficient to form a complex with the ligand having lower dissociation pressure. The driving force is greater for said ligand, and it is sorbed (complexed) more selectively from the liquid feed stream mixture.

When the sorption is conducted in the vapor phase, it is usually conducted at temperatures within about 20° F. of the dew point of the gaseous ligand being sorbed selectively, and more preferably within about 10° F. of said dew point.

This invention will be illustrated in greater detail by the following examples, which are included herein for illustrative purposes and should not be considered limiting upon the present invention. In the below examples all percentages (%) are by weight unless otherwise indicated.

Example 1

A mixture containing 10 gms. of 1,5,9-cis,trans, trans-cyclododecatriene, 11 gms. of 1,5,9-trans,trans, trans-cyclododecatriene and 14 gms. of tetradecane was stirred at room temperature (75° F.) with 6.3 gms. of active cuprous chloride sorbent under nitrogen blanket. The active cuprous chloride sorbent was prepared in accordance with the procedure indicated hereinabove by dissolving cuprous chloride salt in isobutylene solvent, filtering to remove insolubles, contact with butadiene at 5 to 15° F. for 30 minutes to form the cuprous chloride-butadiene insoluble complex, and thermally decomplexing at 170 to 190° F. for 30 minutes to thereby form the active cuprous chloride sorbent. This sorbent is characterized by a porosity of above about 25% (of the total volume of a particle) being 550 to 10,000 A. pores.

Samples of the product stream, from which the cyclic cis isomers were being selectively removed by complexation with the active cuprous chloride sorbent particles, were taken after one and two hours, and the composition of the streams emanating from the sorbent are tabulated below in Table I.

TABLE I

| Reaction Time (hrs.) | Percent CDT-TTT | Percent CDT-CTT | Percent Tetradecane |
| --- | --- | --- | --- |
| 0 | 23 | 21 | 56 |
| 1 | 23.9 | 15.2 | 62.9 |
| 2 | 24.5 | 12 | 63.5 |

As will be noted from the data of Table I above, only the cis, trans,transiomer present in the above mixture is complexed with the cuprous halide sorbent as indicated by the reduced concentration of the cis,trans,trans-cyclododecatriene present in the stream emanating from contact of the fresh feedstream with the active cuprous chloride sorbent particles.

Example 2

A commercial sample of 21 gms. of 1,5,9-trans,trans, trans,-cyclododecatriene containing about 5 wt. percent of the cis,trans,trans,-isomer was diluted with 21 gms. of tetradecane and stirred overnight in contact with 6.3 gms. of active cuprous chloride sorbent (prepared as indicated in accordance with Example 1 above) under nitrogen at room temperature (75° F.). When a sample was taken after this point, the cis,trans,trans-1,5,9-cyclododectriene content of the resulting stream had decreased from 5 wt. percent to 1%, whereas the 1,5,9-trans-trans, trans-cyclododecatriene content had not reduced whatsoever from that of the fresh feed stream.

Example 3

28 g. cyclooctadiene-1,5 and 28 g. cyclooctadiene-1,3 were mixed and added to 18 g. active cuprous chloride. The mixture was stirred at room temperature. After standing overnight the overstanding liquid was analyzed as well as the insoluble complex. At least 95% of the cuprous chloride had reacted with the 1,5 isomer. The insoluble complex was thermally decomposed at temperatures up to 150° C. and 0.05 mm. vacuo. The residue was pure, active cuprous chloride. The distillate was 1,5-cyclooctadiene with only a trace of 1,3-cyclooctadiene present. This demonstrates the selectivity of the complexing reaction clearly. The 1,5-isomer is the more reactive one in this complexing reaction.

Example 4

This example shows the stepwise complexing of a partially hydrogenated cyclododecatriene mixture A, consisting of cis,trans,trans-cyclododecatriene CTT (CDT), cyclododecatriene (CDDE), cyclododecene (CDE) and cyclododecane (CDA). The figures are given in parts present in mixture on a solvent free basis.

|   | CDA | CDE | CDDE | CDT |
|---|-----|-----|------|-----|
| A | 10  | 29  | 39   | 21  |
| B | 10  | 29  | 28   | 6   |
| C | 10  | 29  | 12   | 2   |

First 37 g. of a 50% solution of A in heptane was shaken at room temperature together with 7 g. active CuCl. The overstanding liquid (B) was then analyzed by gas chromatography. Then the reaction was continued at 0° C. with shaking and again the top layer analyzed (C). As can be seen in the above table most CDT and the majority of the CDDE were removed in this first experiment. These results clearly indicate the feasibility of such a separation.

Example 5

This example demonstrates the selective removal of norbornadiene from a feedstream containing cyclooctadiene-1,5, norbornadiene and heptane solvent. 0.5 g. active cuprous chloride was shaken for 24 hrs. with 3 g. of a mixture of 16.4% cyclooctadiene-1,5, 15.1% norbornadiene and 68.5% heptane. After this period the overstanding liquid was analyzed: only less than 3% of the cyclooctadiene was removed, whereas 55% of the norbornadiene had complexed and become insoluble. The complexed norbornadiene is then recovered in essentially pure form by thermal decomplexation of the cuprous chloride-norbornadiene complex.

Example 6

This example shows the effectiveness of cuprous chloride in the removal of dicyclopentadiene from a hydrocarbon feedstream. 0.5 g. active cuprous chloride was shaken for 4 hrs. with 3 g. of a mixture of 17.7% dicyclopentadiene and 82.3% heptane. An analysis after this period showed a decrease of the dicyclopentadiene in the liquid phase from 17.7% to 3.9% (normalized). The complexed dicyclopentadiene is then recovered in substantially pure form by desorption of the cuprous chloride complex.

Example 7

Displacement of a cuprous chloride-cyclododecatriene (CTT) complex with norbornadiene (NBD) is accomplished according to the following equation:

$$2\ CuCl \cdot CDT + excess\ NBD \rightarrow 2\ CuCl \cdot NBD + CDT$$

(CDT=cyclododecatriene; NBD=norbornadiene)

by shaking 0.9 g. of a solid complex, 2 CuCl·CDT, with 3.6 g. of a mixture of 47.9% norbornadiene and 52.1% tetradecane at room temperature for 7 hours. After 7 hours the composition of the liquid phase was: 10% CDT, 40.4% NBD, 49.6% tetradecane. This means that the CDT complex was quantitatively converted into the NBD complex at room temperature. This example demonstrates the facile interconversion of one cuprous chloride complex into another one. It also demonstrates that in many cases cuprous chloride olefin complexes can be employed for olefin separations instead of cuprous chloride alone.

Example 8

0.5 g. active cuprous chloride was shaken over 41 hrs. with 2.7 g. of a mixture of 29.4% vinylcyclohexene and 75.5% heptane. No reaction could be detected at room temperature because no complexing occurs between the cuprous chloride and vinyl cyclohexene at room temperature.

Example 9

0.5 g. active cuprous chloride was shaken with 3 g. of a mixture of 16.8% cycloheptatriene and 83.2% heptane. After shaking at room temperature for several days no reaction was observed due to the lack of complex formation at room temperature.

While the above examples illustrate the invention in great detail, it should be understood that the present invention in its broadest aspect is not necessarily limited to the feedstreams, sorbents, or sorption-desorption conditions set forth in the above examples. The invention is limited only by the claims which follow.

We claim:
1. A process for separation cyclic olefins selected from the group consisting of cyclic diolefins, cyclic triolefins, and mixtures thereof contained in a feedstream hydrocarbon mixture which comprises contacting said mixture with porous sorption active cuprous halide sorbent particles having a porosity of about 10% (of the total volume of a particle) 550 to 10,000 A. pores at temperature and pressure conditions sufficient to form a complex with the more reactive cyclic olefin.

2. A process as in claim 1 wherein said contact is conducted in vapor phase with said feedstream mixture at temperatures within about 20° F. of its dew point.

3. A process as in claim 1 wherein said contact is conducted in liquid phase employing less than the stoichiometric amount of said cuprous halide sorbent.

4. A process as in claim 1 wherein said sorption-active cuprous halide sorbent is cuprous chloride.

5. A process as in claim 3 wherein some cuprous halide salt is present along with said active cuprous halide sorbent particles.

6. A process for separating cyclic olefins selected from the group consisting of 1,5- and 1,3-cyclooctadiene, trans, trans,trans- and cis,trans,trans-cyclododecatriene, mixtures thereof, and mixtures thereof with norbornadiene contained in a hydrocarbon feedstream mixture which comprises contacting said mixture with porous, sorption-active cuprous chloride particles having a porosity of above about 10% (of the total volume of a particle) 550 to 10,000 A. pores at temperature and pressure conditions sufficient to form a complex with the more reactive cyclic olefin, and thermally decomplexing said complex to desorb the more reactive cyclic olefin therefrom in a higher purity than present in said feedstream mixture.

7. A process as in claim 6 wherein said cyclic olefins are trans,trans,trans-cyclododecatriene and cis,trans,trans-cyclododecatriene and the cis,trans,trans-isomer is preferentially complexed.

8. A process as in claim 6 wherein said cyclic olefins are 1,5-cyclooctadiene and 1,3-cyclooctadiene and the 1,5-isomer is preferentially complexed.

9. A process as in claim 6 wherein said cyclic olefins are a mixture thereof with norbornadiene and the norbornadiene is preferentially complexed.

10. A process as in claim 6 wherein the uncomplexed remainder of said feedstream mixture is recovered and the less reactive cyclic olefin is removed therefrom by distillation.

References Cited
UNITED STATES PATENTS

| | | | |
|---|---|---|---|
| 2,386,256 | 10/1945 | Morris | 260—666 |
| 2,386,333 | 10/1945 | Morris | 260—666 |
| 2,386,334 | 10/1945 | Morris | 260—666 |
| 3,206,521 | 9/1965 | Long | 260—674 |
| 3,243,471 | 3/1966 | Stern | 260—677 |

DELBERT E. GANTZ, *Primary Examiner.*

V. O'KEEFE, *Assistant Examiner.*